US012693963B2

(12) United States Patent
Adachi et al.

(10) Patent No.: US 12,693,963 B2
(45) Date of Patent: Jul. 28, 2026

(54) TEST SUPPORT APPARATUS, TEST SUPPORT METHOD AND PROGRAM

(71) Applicant: NTT, Inc.

(72) Inventors: Yu Adachi, Tokyo (JP); Haruto Tanno, Tokyo (JP); Hiroyuki Kirinuki, Tokyo (JP)

(73) Assignee: NTT, Inc., Tokyo (JP)

( * ) Notice: Subject to any disclaimer, the term of this patent is extended or adjusted under 35 U.S.C. 154(b) by 336 days.

(21) Appl. No.: 18/557,274

(22) PCT Filed: Apr. 30, 2021

(86) PCT No.: PCT/JP2021/017246
§ 371 (c)(1),
(2) Date: Oct. 25, 2023

(87) PCT Pub. No.: WO2022/230188
PCT Pub. Date: Nov. 3, 2022

(65) Prior Publication Data
US 2024/0211385 A1     Jun. 27, 2024

(51) Int. Cl.
*G06F 11/3668*          (2025.01)

(52) U.S. Cl.
CPC ...... *G06F 11/3688* (2013.01); *G06F 11/3684* (2013.01)

(58) Field of Classification Search
None
See application file for complete search history.

(56) References Cited

U.S. PATENT DOCUMENTS

| | | | | |
|---|---|---|---|---|
| 7,752,607 | B2 * | 7/2010 | Larab | G06Q 10/10 |
| | | | | 717/135 |
| 8,255,357 | B1 * | 8/2012 | Heimbach | G06F 21/604 |
| | | | | 707/781 |
| 9,088,551 | B2 * | 7/2015 | Bauchot | G06F 21/10 |
| 9,311,222 | B1 * | 4/2016 | Avery | G06F 9/451 |
| 12,072,791 | B2 * | 8/2024 | Yin | G06V 10/765 |
| 2005/0188349 | A1 * | 8/2005 | Bent | G06F 8/38 |
| | | | | 717/106 |

(Continued)

FOREIGN PATENT DOCUMENTS

JP          2017058983 A          3/2017

OTHER PUBLICATIONS

Katalon, Inc. (2019) "Katalon Automation Recorder Quickstart" literature [online] Accessed on Mar. 12, 2020, website:https://www.katalon.com/resources-center/blog/katalon-automation-recorder/.

(Continued)

*Primary Examiner* — Philip Wang

(57)          ABSTRACT
The test support device includes: a first reception unit that receives input of a list of input value candidates for an input element to which a value is input, among elements constituting a certain screen related to software to be tested; and a setting unit that sets one of the candidates included in the list as the input element, wherein after an operation is performed on an operation element among the elements constituting the screen, the operation element receiving an operation indicating an execution instruction of processing, the setting unit sets the candidate, which is not set as the input element, as the input element. Accordingly, the efficiency of software testing work can be improved.

17 Claims, 9 Drawing Sheets

510

ELEMENT A

ELEMENT B

ELEMENT C

ELEMENT D          REGISTER b1

START VARIATION TEST

(56)  References Cited

U.S. PATENT DOCUMENTS

| | | | |
|---|---|---|---|
| 2008/0109191 A1* | 5/2008 | Cooney | G06Q 10/04 |
| | | | 702/189 |
| 2010/0175055 A1* | 7/2010 | Wang | G06F 8/42 |
| | | | 717/137 |
| 2012/0159322 A1* | 6/2012 | Ikegami | G06F 9/451 |
| | | | 715/700 |
| 2012/0167059 A1* | 6/2012 | Kosuda | G06F 11/3676 |
| | | | 717/131 |
| 2012/0290527 A1* | 11/2012 | Yalamanchilli | G06F 16/254 |
| | | | 707/602 |
| 2013/0024847 A1* | 1/2013 | Browne | G06F 11/3604 |
| | | | 717/131 |
| 2016/0179658 A1* | 6/2016 | Avery | G06F 11/3698 |
| | | | 717/135 |
| 2016/0317023 A1* | 11/2016 | Charlier | A61B 3/024 |
| 2019/0065351 A1* | 2/2019 | Rakhmilevich | G06F 9/4856 |
| 2022/0229764 A1* | 7/2022 | Zhai | G06F 18/214 |
| 2022/0300396 A1* | 9/2022 | Zhai | G06F 11/3684 |

OTHER PUBLICATIONS

Selenium (2020) "Understanding components" literature [online] Accessed on Mar. 2, 2020, website: https://www.selenium.dev/documentation/ja/webdriver/understanding_the_components/.

* cited by examiner

10

TEST SUPPORT APPARATUS, TEST SUPPORT METHOD AND PROGRAM

CROSS-REFERENCE TO RELATED APPLICATIONS

This application is a U.S. 371 Application of International Patent Application No. PCT/JP2021/017246, filed on 30 Apr. 2021, the disclosure of which is hereby incorporated herein by reference in its entirety.

TECHNICAL FIELD

The present invention relates to a test support device, a test support method, and a program.

BACKGROUND ART

Conventionally, in order to improve the efficiency of software testing, automated testing techniques such as "Record & Replay" and "programming" have been devised. "Record & Replay" is a technique that automates testing by recording a user operation as a script and executing the script (NPL 1). "Programming" is a technique for describing a test code as a program by using a library for operating a browser (NPL 2).

However, since it is difficult to complete testing only with automated testing, exploratory testing, which is manual testing, is performed. Exploratory testing is a method of considering what to test next while conducting software testing. In the exploratory testing, a testing content is determined on a case-by-case basis with attention paid to the last testing result or the behavior of software during testing, whereby a spot in which a system problem possibly hides is intensively tested.

CITATION LIST

Non Patent Literature

[NPL 1] "Katalon Automation Recorder Quickstart," [online], Internet www.katalon.com/resources-center/blog/katalon-automation-recorder/
[NPL 2] Selenium WebDriver, "Understanding a component," [online] Internet www.selenium.dev/documentation/ja/webdriver/understanding_the_components/

SUMMARY OF INVENTION

Technical Problem

Since exploratory testing is an interactive method in which the tester checks the test results, input and manipulation of elements on the screen must be performed manually. Although there are cases where various inputs are desired to be performed on the same screen, it is necessary to repeatedly reproduce the procedures up to the screen. When conventional automated testing is used for exploratory testing, it is necessary to prepare a test script or a program separately, not during the exploratory testing.

The present invention was contrived in view of the foregoing points, and an object thereof is to improve the efficiency of software testing work.

Solution to Problem

In order to solve the above problems, a test support device includes: a first reception unit that receives input of a list of input value candidates for an input element to which a value is input, among elements constituting a certain screen related to software to be tested; and a setting unit that sets one of the candidates included in the list as the input element, wherein after an operation is performed on an operation element among the elements constituting the screen, the operation element receiving an operation indicating an execution instruction of processing, the setting unit sets the candidate, which is not set as the input element, as the input element.

Advantageous Effects of Invention

The efficiency of software testing work can be improved.

DESCRIPTION OF EMBODIMENTS

Figure 1:
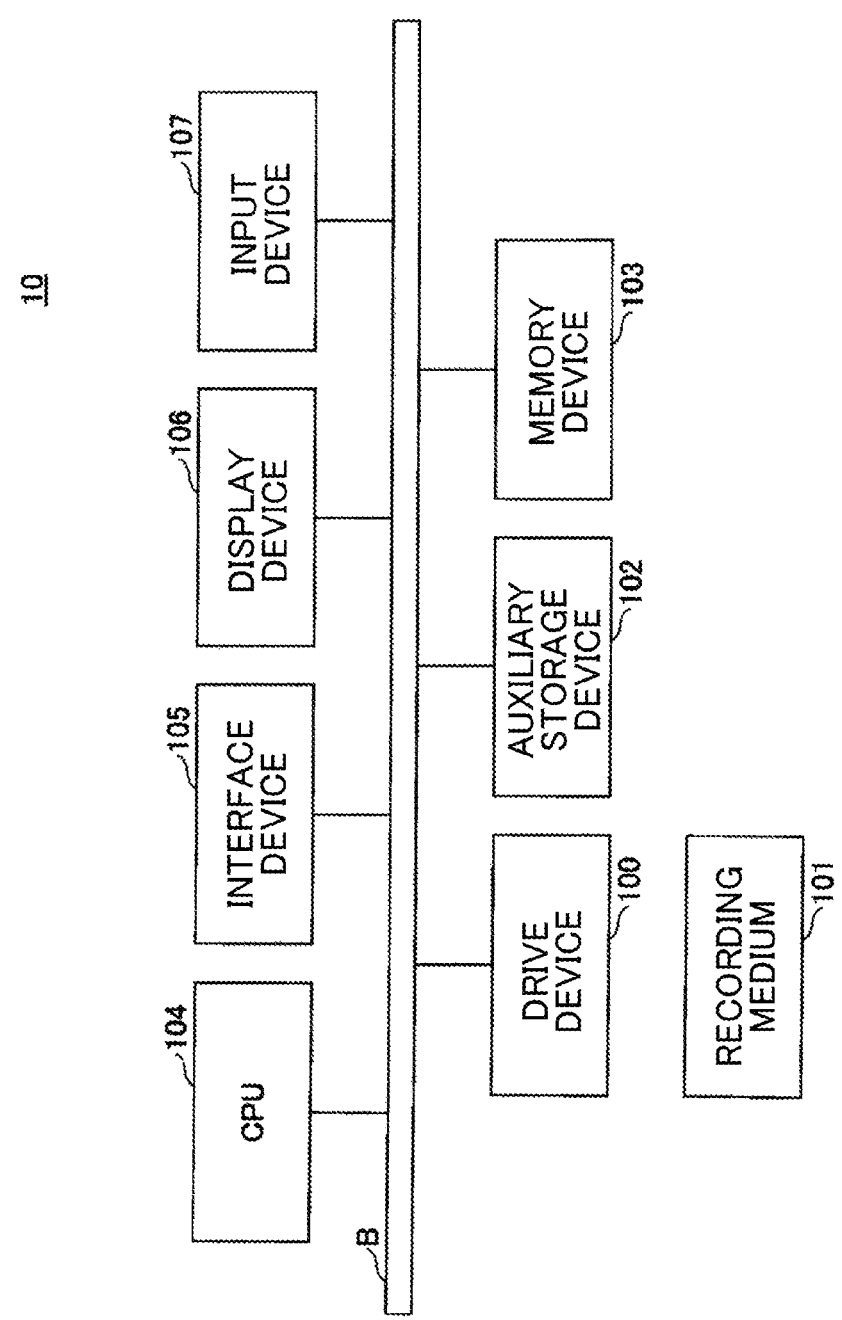
FIG. 1 is a diagram showing an example of a hardware configuration of a test support device 10 according to an embodiment of the present invention.

Embodiments of the present invention will be described below with reference to the drawings. FIG. 1 is a diagram showing an example of a hardware configuration of a test support device 10 according to an embodiment of the present invention. The test support device 10 of FIG. 1 includes a drive device 100, an auxiliary storage device 102, a memory device 103, a CPU 104, an interface device 105, a display device 106, an input device 107, and the like, all of which are connected to one another via a bus B.

A program that realizes processing in the test support device 10 is provided by a recording medium 101 such as a CD-ROM. When the recording medium 101 storing the program is set in the drive device 100, the program is installed from the recording medium 101 to the auxiliary storage device 102 via the drive device 100. However, the program does not necessarily have to be installed from the recording medium 101 and may be downloaded from another computer via a network. The auxiliary storage device 102 stores the installed program as well as necessary files, data, and the like.

The memory device 103 reads and stores the program from the auxiliary storage device 102 when there is an instruction to start the program. The CPU 104 implements functions related to the test support device 10 according to the program stored in the memory device 103. The interface device 105 is used as an interface for connection to a network. The display device 106 displays a GUI (Graphical User Interface) or the like according to the program. The input device 107 is constituted by a keyboard and a mouse, for example, and is used to input various operation instructions.

Figure 2:
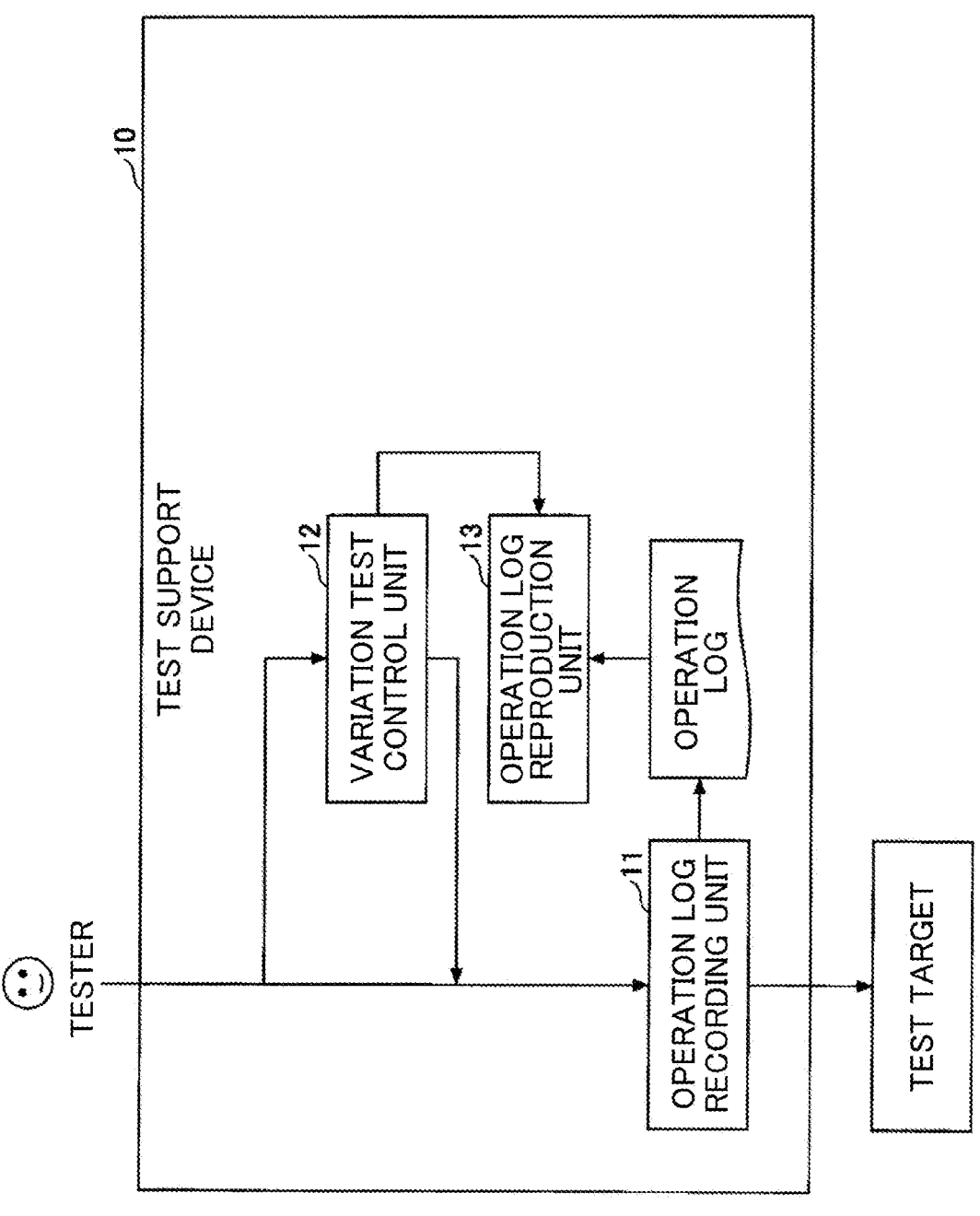
FIG. 2 is a diagram showing an example of a functional configuration of the test support device 10 according to an embodiment of the present invention.

FIG. 2 is a diagram showing an example of a functional configuration of the test support device 10 according to an embodiment of the present invention. In FIG. 2, the test support device 10 has an operation log recording unit 11, a variation test control unit 12, and an operation log reproduction unit 13. The respective units are realized by processing that one or more programs installed in the test support device 10 cause the CPU 104 to perform.

Figure 3:
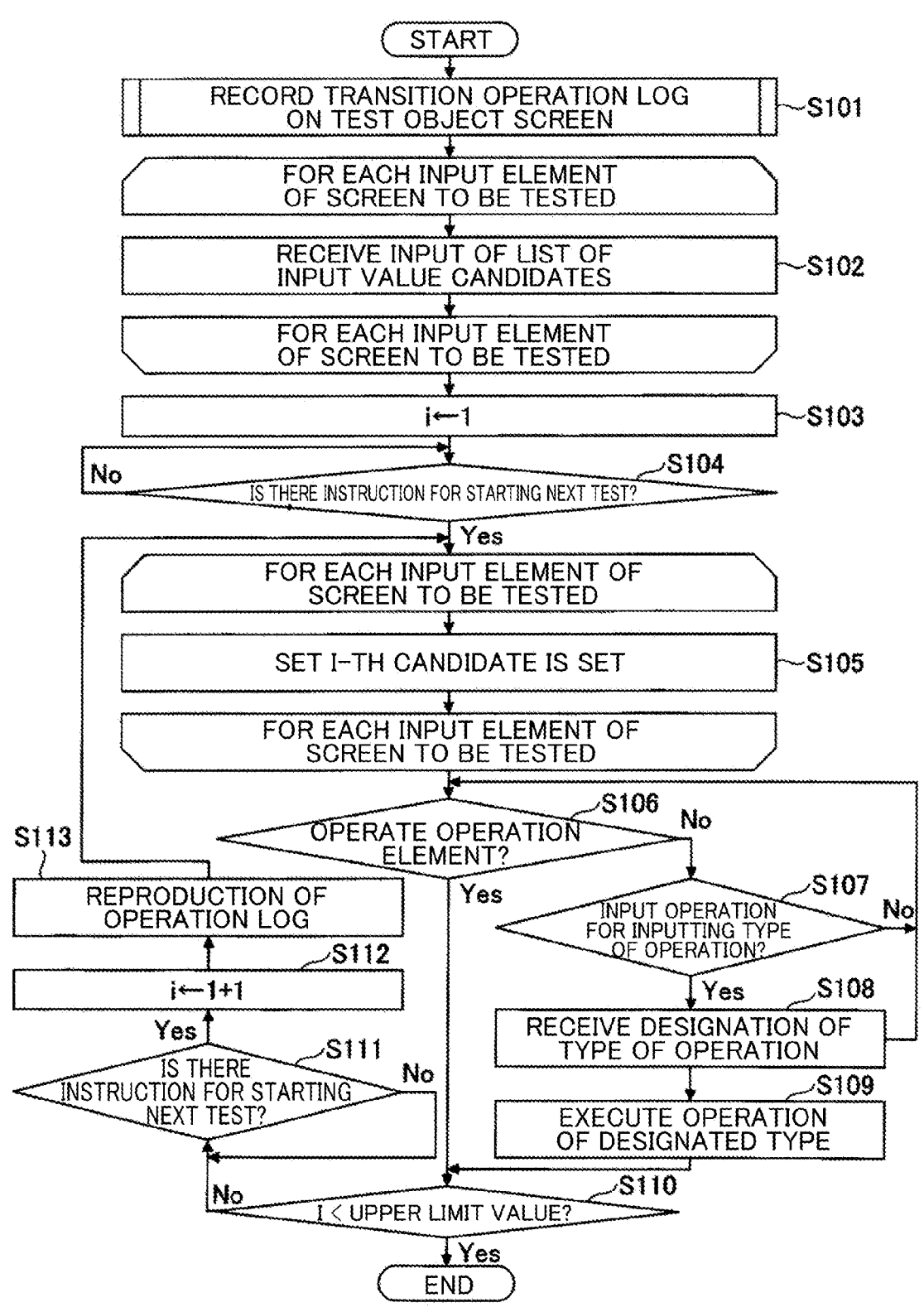
FIG. 3 is a flowchart for explaining an example of a processing procedure executed by the test support device 10.

Hereinafter, a processing procedure executed by the test support device 10 will be described. FIG. 3 is a flowchart for explaining an example of the processing procedure executed by the test support device 10.

In step S101, the operation log recording unit 11 executes recording processing of an operation log for transition to a certain screen (for example, a Web page or the like) to be tested.

Here, for software to be tested (referred to as "target software" hereinafter), operations performed until the transition to a screen to be tested (referred to as "target screen" hereinafter) is made are executed by a user, a test operator (tester). The operation log recording unit 11 records an operation log that includes information indicating the history of each operation (information indicating which elements are operated on which screen, in chronological order). Once the transition to the target screen is made, the operation log recording unit 11 stops recording of the operation log in response to a predetermined operation by the user. Therefore, at this point of time, the target screen is displayed on the display device 106.

Figure 4:
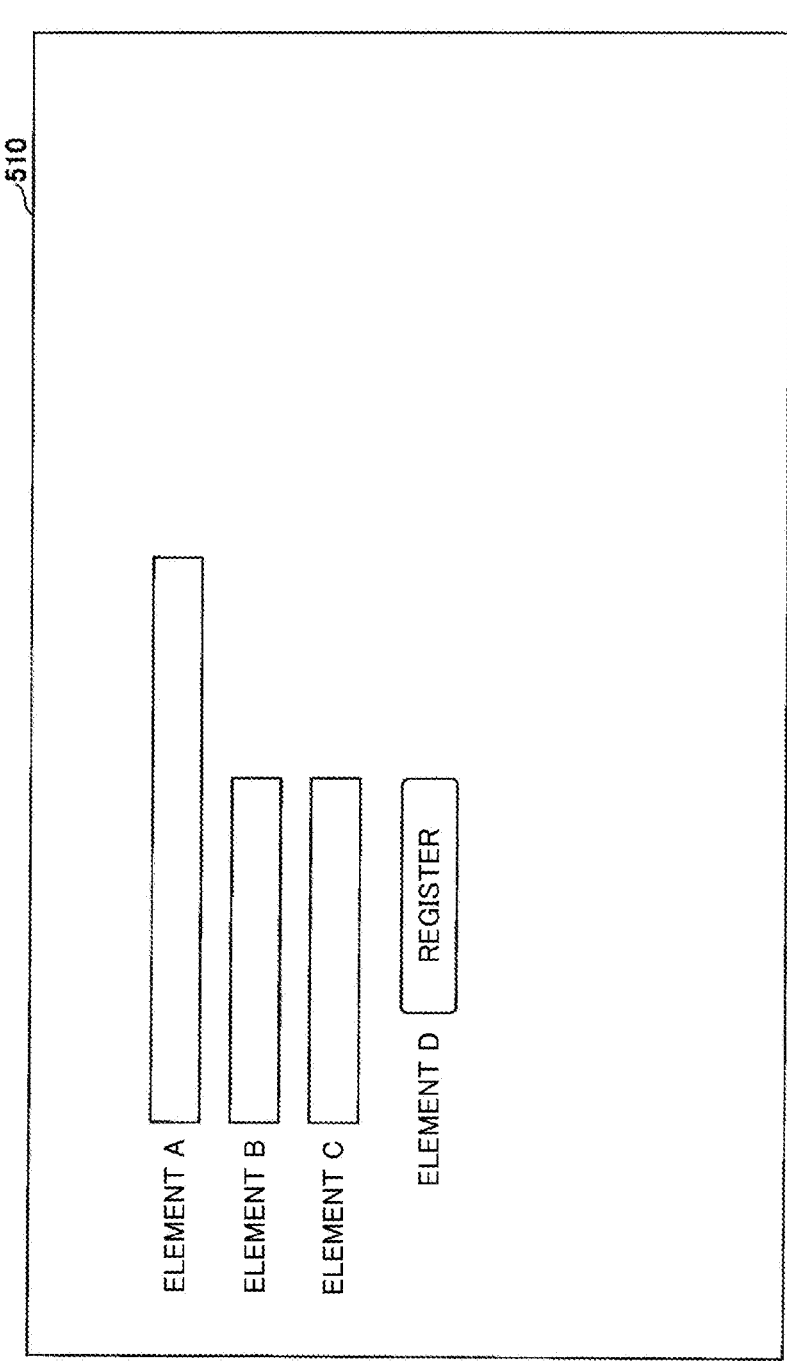
FIG. 4 is a diagram showing a display example of a target screen.

FIG. 4 is a diagram showing an example of display the target screen. As shown in FIG. 4, a target screen 510 includes elements A to D. The elements A to C are the elements to which values are input (referred to as "input elements" hereinafter). The element D is an element that receives an operation indicating an execution instruction of processing (referred to as "operation element" hereinafter).

Then, the variation test control unit 12 receives input of one or more candidates (a list of input value candidates) for input values with respect to each input element on the target screen 510 (S102). How the list of input value candidates is input as follows, for example.

Figure 5:
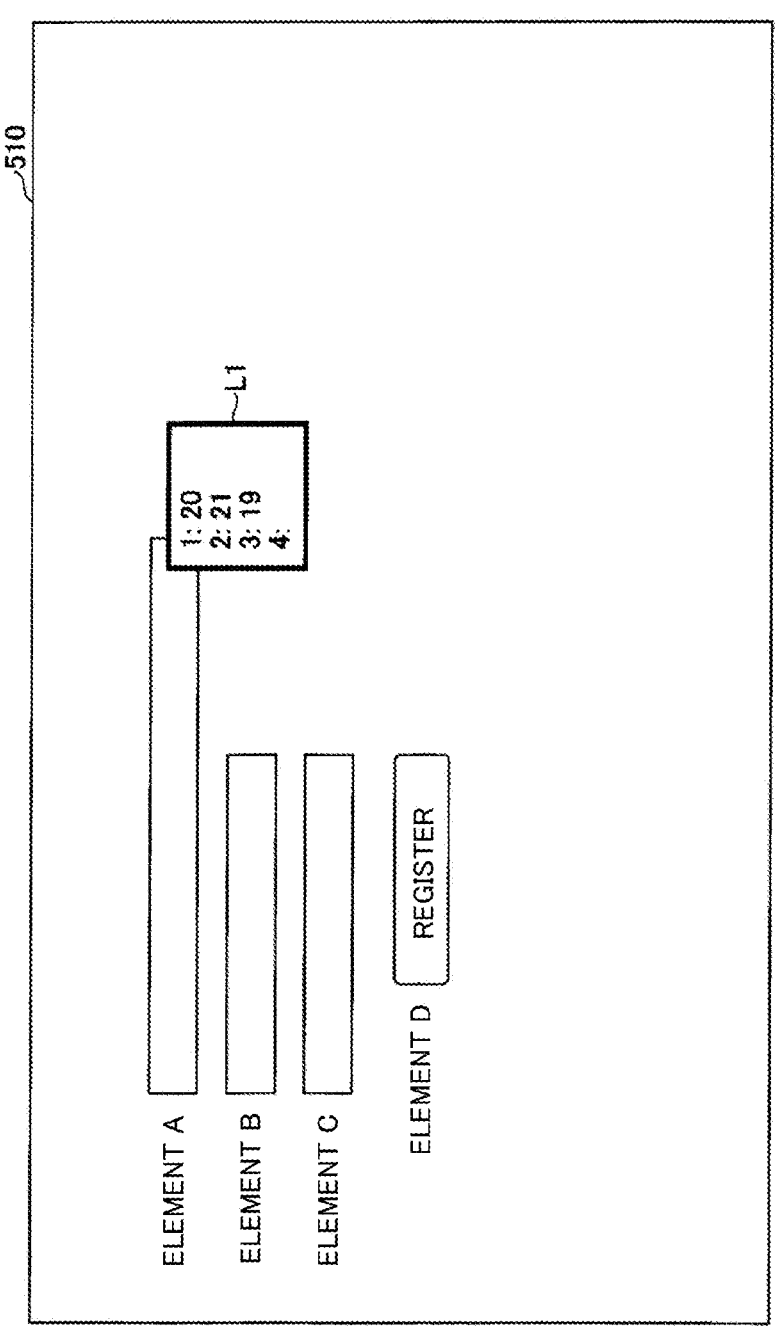
FIG. 5 is a diagram for explaining a method for inputting a list of input value candidates.

FIG. 5 is a diagram for explaining a method of inputting the list of input value candidates. For example, when the user performs a predetermined operation, the variation test control unit 12 displays a list box for setting an input value. The predetermined operation is, for example, "shift+right click" for an input element to be input in the list of input value candidates. In this case, the variation test control unit 12 displays the list box corresponding to the input element "shift+right click." FIG. 5 shows an example in which "shift+right click" is performed for the element A. Therefore, a list box L1 is displayed for the element A. The user inputs one or more candidates (i.e., variations of input values) about input values for the element A to the list box L1. The variation test control unit 12 stores the list of input value candidates input to the list box L1 in the memory device 103 or the auxiliary storage device 102 in association with identification information of the element A. The same processing is executed for the elements B and C. The variation test control unit 12 may automatically generate an input value candidate from a restriction by using an existing technique (for example, Japanese Patent Application Laid-open No. 2020-067859) related to the input variation testing, and display it on a list box.

Subsequently, the variation test control unit 12 substitutes 1 into a variable i (S103). The variable i is a variable for identifying a candidate to be processed in the list of input value candidates of each input element.

Subsequently, the variation test control unit 12 waits for an input of a test start instruction (S104). For example, when a predetermined operation ("shift+right click" or the like) is performed by the user in a state where none of the elements of the target screen 510 is designated, the variation test control unit 12 displays a button for receiving a test start instruction on the target screen 510.

Figure 6:
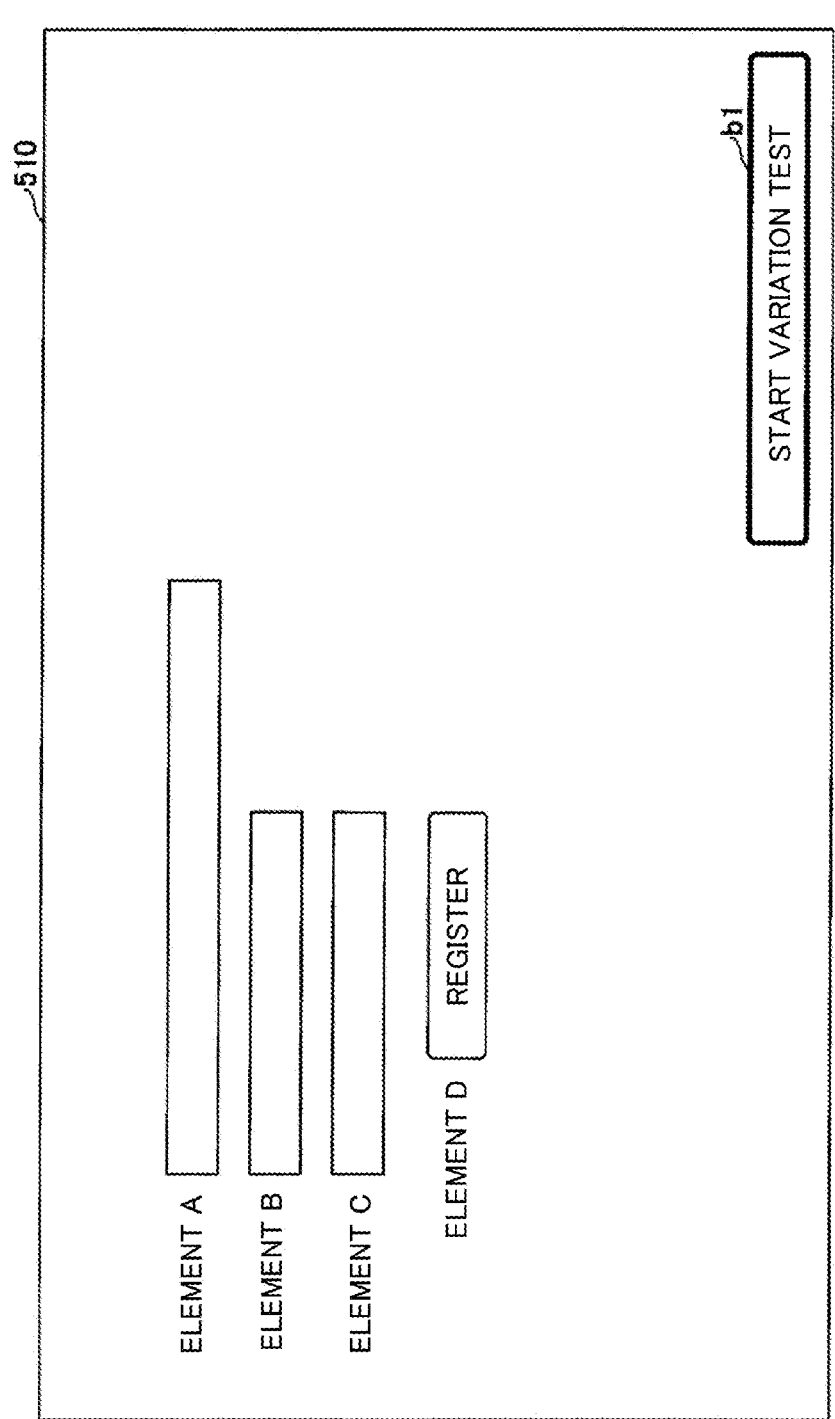
FIG. 6 is a diagram showing an example of displaying a button for receiving an instruction for starting a test.

FIG. 6 is a diagram showing an example of displaying the button for receiving a test start instruction. In FIG. 6, a button b1 is a button for receiving an instruction for starting a test (variation test).

Figure 7:
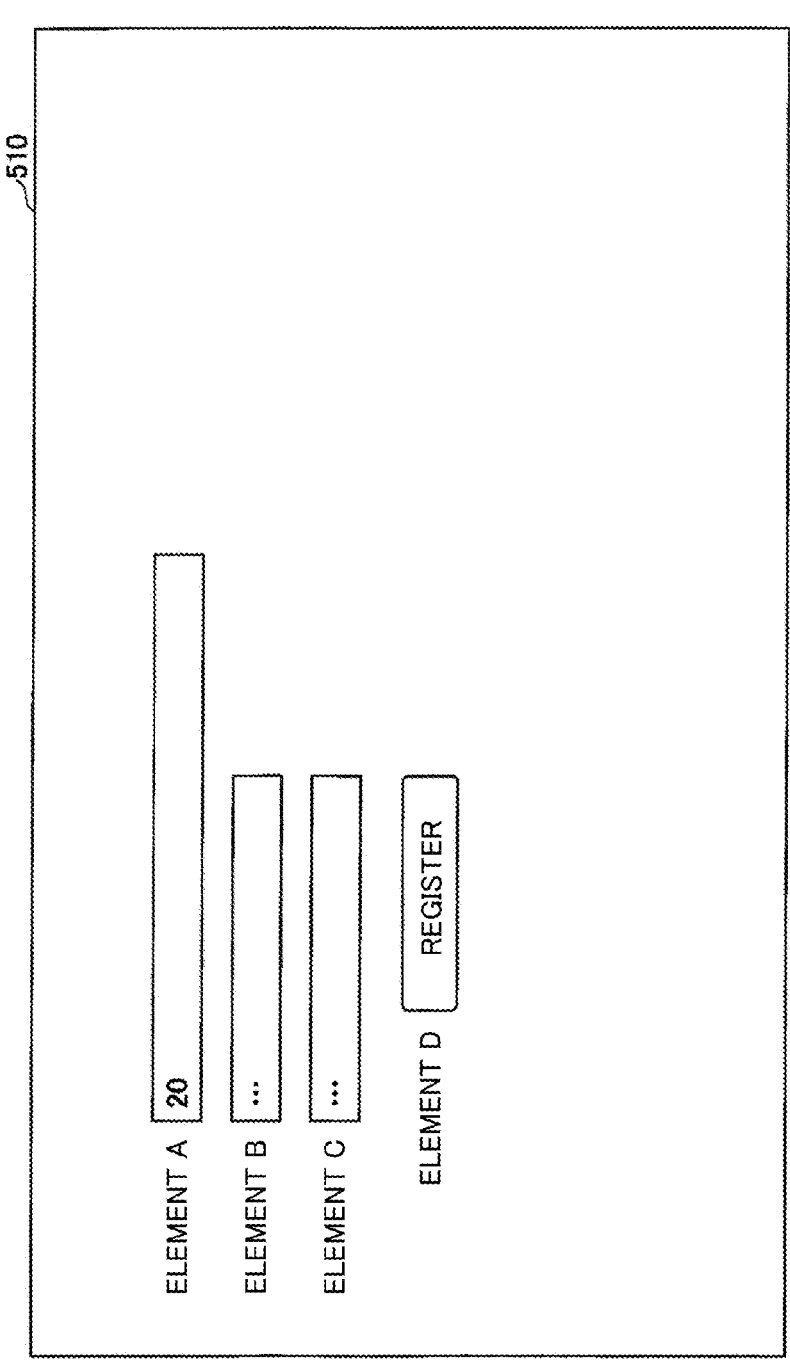
FIG. 7 is a diagram showing a state in which an input value is automatically set in each input element of the target screen.

When the user presses the button b1 (Yes in S104), the variation test control unit 12 deletes the button b1 and sets an i-th candidate of the list of input value candidates et for the input element, as the input element for each input element of the target screen (S105). For the input element having no i-th candidate, for example, any one of the candidates of the list of input value candidates for the input element may be set. When step S105 is executed for all the input elements, the input value is automatically set to each input element of the target screen 510, as shown in FIG. 7. Note that " . . . " for the elements B and C indicates some value.

Subsequently, the variation test control unit 12 waits for a user operation (pressing of the element D) to be performed on the operation element of the target screen 510 (S106).

When an operation for the operation element (pressing the element D) is executed (Yes in S106), the target software executes processing corresponding to the pressing of the element D on the basis of the input value of each input element. As a result, a screen transition and the like occur. The user refers to the processing result to find a bug or record their findings. In so doing, the user may describe bugs, their findings, and the like by using the technique disclosed in International Publication No. 2020/230241. In this case, the operation log recording unit 11 may record a log indicating that the element D has been pressed, in the auxiliary storage device 102.

On the other hand, when a predetermined operation indicating an instruction on inputting the type of operation for the operation element is performed by the user (Yes in S107) instead of the operation to be performed on the operation element (No in S106), the variation test control unit 12 receives the input of the type of operation for the operation element from the user.

Figure 8:
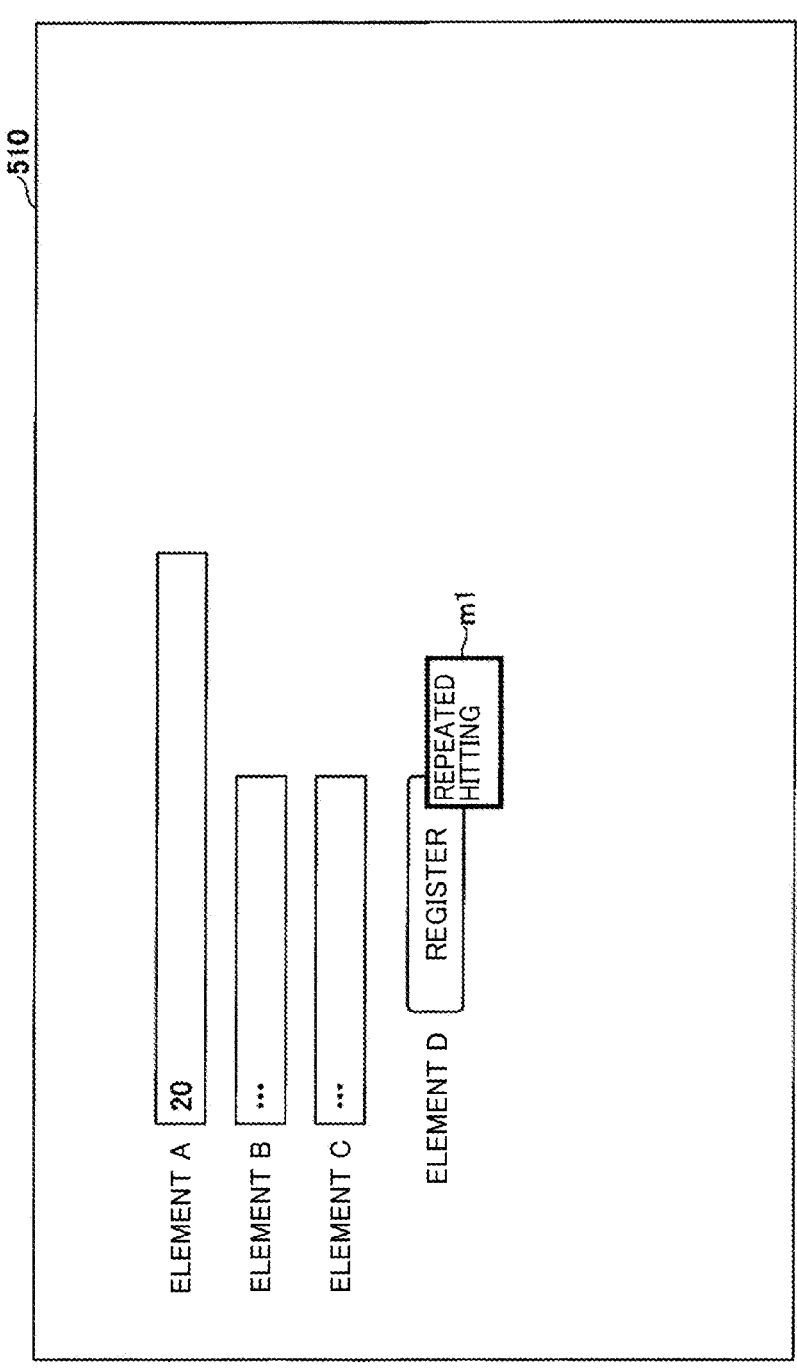
FIG. 8 is a diagram showing an example of receiving an input of the type of an operation.

FIG. 8 is a diagram showing an example of receiving the input of the type of operation. For example, a predetermined operation indicating an instruction on inputting the type of operation for the element D is performed by "shift+right click" or the like for the element D. The variation test control unit 12 displays a menu ml for receiving the type of operation for the element D in accordance with the predetermined operation. In the menu ml, the type of operation for the element D is included as an option. Such option may be defined in advance for each type of operation element, for example. In the example shown in FIG. 8, "repeated hitting" is an option. The "repeated hitting" means hitting the element D repeatedly. Such testing is effective to ensure that the same processing is not duplicated by hitting the element D repeatedly.

When any of the options is selected (any type is designated) by the user, the variation test control unit 12 executes an operation of the type (designated type) corresponding to the selected option, for the operation element (S109), and advances to step S110.

In this case, the target software executes processing corresponding to the repeated hitting of the element D on the basis of the input value of each input element. As a result, a screen transition and the like occur. The user refers to the processing result to find a bug or record their findings. In so doing, the user may describe bugs, their findings, and the like by using the technique disclosed in International Publication No. 2020/230241. In this case, the operation log recording unit 11 may record a log indicating that the element D has been hit repeatedly, in the auxiliary storage device 102.

Next, the variation test control unit 12 determines whether or not i is less than an upper limit value (S110). The upper limit value is the number of input values of a list having the maximum list length among the list of input values for each input element. Although the present embodiment describes an example in which patterns up to the upper limit value are tested for the input value of each input element, combinations of all input value candidates for each input element may be tested.

When i is equal to or greater than the upper limit value (Yes in S110), the processing procedure shown in FIG. 3 ends. When i is less than the upper limit value (No in S110), the variation test control unit 12 waits for an instruction for starting the next test. For example, in the screen to which a screen transition occurs in response to the operation of an operation element (element D) (referred to as "transition destination screen" hereinafter), if a predetermined operation (e.g., "shift+right click" or the like) is performed while no element is designated, the variation test control unit 12 displays, on the transition destination screen, the button for receiving the instruction for starting the next test.

Figure 9:
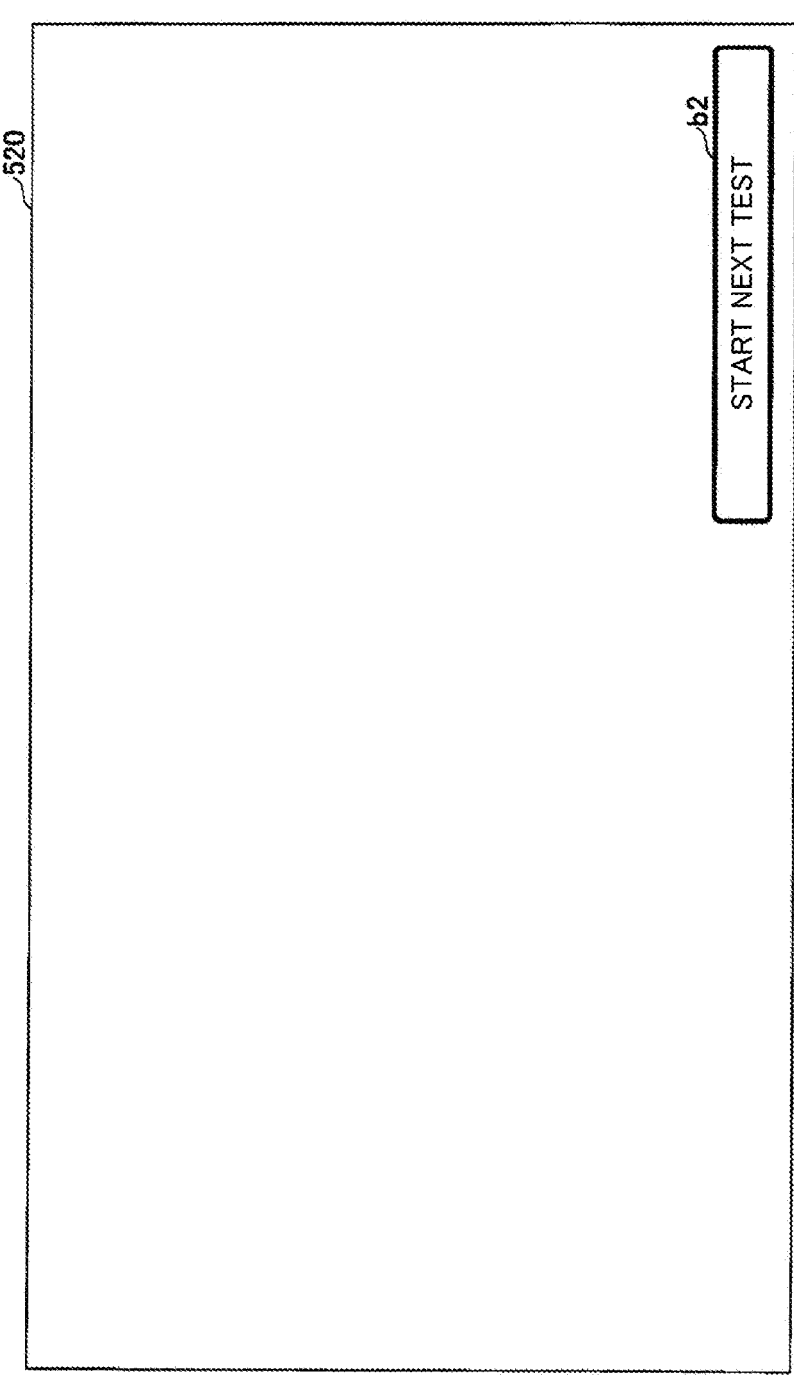
FIG. 9 is a diagram showing an example of displaying a button for receiving an instruction for starting the next test.

FIG. 9 is a diagram showing an example of displaying the button for receiving the instruction of the next test. In FIG. 9, a button b2 on a transition destination screen 530 is the button for receiving the instruction for starting the next test. In FIG. 9, the elements of the transition destination screen 530 are omitted for convenience.

When the user selects the button b2 (Yes in S111), the variation test control unit 12 deletes the button b2 and adds 1 to the variable i (S112).

Subsequently, the operation log reproduction unit 13 reproduces the operation log recorded in step S101 (S113). The reproduction of the operation log refers to automatic execution of the history of an operation recorded in the operation log. In the operation log, a history of an operation for making a transition to the target screen 510 is recorded. Therefore, when the operation log is reproduced, the transition from the transition destination screen 530 to the target screen 510 is executed, and the target screen 510 in the state shown in FIG. 4 is displayed on the display device 106.

Subsequently, the steps following step S105 are repeated, and a variation test based on the i-th input value is executed.

As described above, according to the present embodiment, by setting a list of input value candidates for the input elements on the screen to be tested, testing can be automatically executed sequentially in a state where each candidate is input. Therefore, the efficiency of software testing can be improved.

An operation log for making a transition to the screen to be tested is recorded, and the operation log is reproduced each time the testing of the screen is finished. As a result, it is possible to reduce the operation of repeating a non-essential pre-procedure operation in the testing process.

Meanwhile, in the present embodiment, the variation test control unit 12 is an example of the first reception unit, the setting unit, the second reception unit, and the execution unit. The operation log recording unit 11 is an example of the recording unit. The operation log reproduction unit 13 is an example of the reproduction unit.

Although the embodiments of the present invention have been described in detail above, the present invention is not limited to these particular embodiments, and various modifications and changes are possible within the scope of the gist of the present invention described in the claims.

REFERENCE SIGNS LIST

10 Test support device
11 Operation log recording unit
12 Variation test control unit
13 Operation log reproduction unit
100 Drive device
101 Recording medium
102 Auxiliary storage device
103 Memory device
104 CPU
105 Interface device
106 Display device
107 Input device
B Bus

The invention claimed is:

1. A test support device comprising a processor configured to execute operations comprising:
   receiving a list of input value candidates of an input element, wherein the input element represents an input field in a screen of software to be tested;
   setting an input value candidate of the list of the input value candidates in the input element;
   interactively receiving a selection of a button, wherein the button specifies a start of a variation test, and the variation test includes testing the software by setting and updating a value of the input element; and
   updating, after an operation is performed on an operation element in the screen by using the input value candidate as a value of the input element, a value of the input element according to another input value candidate in the list of input value candidates.

2. The test support device according to claim 1, the processor further configured to execute operations comprising:
   recording a history of an operation performed on the screen until a transition to the screen occurs;
   reproducing an operation according to the history after the operation on the operation element is performed; and
   updating, after reproduction of the history, the value of the input element according to said another input value candidate in the list of input value candidates.

3. The test support device according to claim 2, the processor further configured to execute operations comprising:
   receiving designation of a type of an operation performed on the operation element; and
   executing an operation of a type related to the designation, on the operation element.

4. The test support device according to claim 1, the processor further configured to execute operations comprising:

receiving designation of a type of an operation performed on the operation element; and executing an operation of a type related to the designation, on the operation element.

5. The test support device according to claim 1, wherein the receiving the list of input value candidates further comprises:

receiving a predetermined operation on the input element;

in response to the predetermined operation on the input element, interactively receiving a plurality of input value candidates; and generating the list of input value candidates of the input element.

6. The test support device according to claim 5, wherein the predetermined operation includes a combination of entering a shift key and a right click.

7. A computer implemented method for supporting a test, comprising:

receiving a list of input value candidates of an input element, wherein the input element represents an input field in a screen of software to be tested;

setting an input value candidate of the list of the input value candidates in the input element;

interactively receiving a selection of a button, wherein the button specifies a start of a variation test, and the variation test includes testing the software by setting and updating a value of the input element; and updating, after an operation is performed on an operation element in the screen by using the input value candidate as a value of the input element, a value of the input element according to another input value candidate in the list of input value candidates.

8. The computer implemented method according to claim 7, further comprising:

recording a history of an operation performed on the screen until a transition to the screen occurs;

reproducing an operation according to the history after the operation on the operation element is performed; and updating, after reproduction of the history, the value of the input element according to said another input value candidate in the list of input value candidates.

9. The computer implemented method according to claim 8, further comprising:

receiving designation of a type of an operation performed on the operation element; and executing an operation of a type related to the designation, on the operation element.

10. The test support method according to claim 7, further comprising:

receiving designation of a type of an operation performed on the operation element; and executing an operation of a type related to the designation, on the operation element.

11. The computer implemented method according to claim 7, wherein the receiving the list of input value candidates further comprises:

receiving a predetermined operation on the input element;

in response to the predetermined operation on the input element, interactively receiving a plurality of input value candidates; and generating the list of input value candidates of the input element.

12. The computer implemented method according to claim 11, wherein the predetermined operation includes a combination of entering a shift key and a right click.

13. A computer-readable non-transitory recording medium storing computer-executable program instructions that when executed by a processor cause a computer to execute operations comprising:

receiving input of a list of input value candidates for an input element to which a value is input, among elements constituting a certain screen related to software to be tested;

setting one of the candidates included in the list as the input element, wherein after an operation is performed on an operation element among the elements constituting the screen, the operation element receiving an operation indicating an execution instruction of processing, the setting further comprises setting the one of the candidates, which is not set as the input element, as the input element; and interactively receiving a selection of a button, wherein the button specifies a start of a variation test, and the variation test includes testing the software by setting and updating a value of the input element.

14. The computer-readable non-transitory recording medium according to claim 13, the computer-executable program instructions when executed further causing the computer to execute operations comprising:

recording a history of an operation performed on the screen until a transition to the screen occurs;

reproducing an operation according to the history after the operation on the operation element is performed; and updating, after reproduction of the history, the value of the input element according to said another input value candidate in the list of input value candidates.

15. The computer-readable non-transitory recording medium according to claim 13, the computer-executable program instructions when executed further causing the computer to execute operations comprising:

receiving designation of a type of an operation performed on the operation element; and executing an operation of a type related to the designation, on the operation element.

16. The computer-readable non-transitory recording medium according to claim 13, wherein the receiving the list of input value candidates further comprises:

receiving a predetermined operation on the input element;

in response to the predetermined operation on the input element, interactively receiving a plurality of input value candidates; and generating the list of input value candidates of the input element.

17. The computer-readable non-transitory recording medium according to claim 16, wherein the predetermined operation includes a combination of entering a shift key and a right click.

* * * * *